United States Patent [19]
Skelhorn

[11] Patent Number: 5,744,530
[45] Date of Patent: Apr. 28, 1998

[54] GRANULAR CALCIUM CARBONATE FOR USE AS A DIRECT ADDITIVE FOR THERMOPLASTICS

[75] Inventor: David A. Skelhorn, Sandersville, Ga.

[73] Assignee: ECC International Inc., Roswell, Ga.

[21] Appl. No.: 639,309

[22] Filed: Apr. 25, 1996

Related U.S. Application Data

[63] Continuation of Ser. No. 171,534, Dec. 22, 1993, abandoned.

[51] Int. Cl.⁶ ................................................ C08K 3/26
[52] U.S. Cl. .................. 524/427; 524/424; 524/475; 523/210
[58] Field of Search ........................... 524/425, 424, 524/426, 427; 523/210

[56] References Cited

U.S. PATENT DOCUMENTS

| 4,803,231 | 2/1989 | Seinera et al. |
| 4,898,620 | 2/1990 | Rayfield et al. ............... 524/425 |

FOREIGN PATENT DOCUMENTS

| 2016447 | 11/1990 | Canada. |
| 0 203 017 | 11/1986 | European Pat. Off.. |
| 0 355 808 | 2/1990 | European Pat. Off.. |

OTHER PUBLICATIONS

Chart of Conversions "Characteristics of Particles".
Tsukizaka et al., "Polypropylene Composition", (1974), CA82(12):73958w (CA Abstract Only).
Ling, ". . . High–Content Filled Master Bath . . . ", (1991), CA117(2):9309z (CA Abstract Only).
Mitsuishi et al., "High Loading Effect of Surface–Modified Inorganic Particles in Polymer Materials", (1989), CA111(14): 116163v (CA Abstract Only).

*Primary Examiner*—Ralph H. Dean
*Attorney, Agent, or Firm*—Suzanne Kikel

[57] ABSTRACT

A thermoplastic granule containing a high proportion of a particulate carbonate filler in a thermoplastic binder, for blending with an end product thermoplastic in which the carbonate filler is to be dispersed. The granule comprises at least 85% by weight of a particulate carbonate which is coated with one or more fatty acids having a carbon chain length of from 12 to 20 carbon atoms. The balance of the granule by weight comprises a thermoplastic polymeric binder which is solid at ambient temperature and is compatible with the end product thermoplastic in which the carbonate filler is to be dispersed. The polymeric binder is an amorphous polyolefins and/or a highly branched polyethylene wax. The PSD of the carbonate is selected to maximize packing.

21 Claims, 4 Drawing Sheets

GRANULAR CALCIUM CARBONATE FOR USE AS A DIRECT ADDITIVE FOR THERMOPLASTICS

This Application is a Continuation of application Ser. No. 08/171,534, filed Dec. 22, 1993, now abandoned.

FIELD OF INVENTION

This invention relates generally to mineral fillers for thermoplastics, and more specifically relates to a thermoplastic granule or pellet containing a high proportion of a particulate carbonate filler in a thermoplastic binder, for blending with an end product thermoplastic in which the carbonate filler is to be dispersed.

BACKGROUND OF INVENTION

The present invention relates to a particulate product containing a high concentration of an inorganic material, and, in particular, of calcium carbonate, which may be blended with a thermoplastic polymer, such as a polyolefin. The blend produced will result in a homogeneous, inorganic material filled composite after being processed using conventional methods such as injection molding and extrusion. The invention allows inorganic material filling of thermoplastics to be achieved without the need for a separate mixing process. The invention provides a means of achieving higher concentrations of inorganic material than has been achievable by prior art without the use of an agent or additive (sometimes referred to in prior art patents as "fluidifacients") designed to facilitate ease of redispersion.

The thermoplastic processing industry has long used inorganic materials as additives for thermoplastic resins. Introduction of these inorganic materials into the polymer has traditionally been achieved using a number of techniques, including those described below.

a) The polymer, inorganic material and other additives may be subjected to intensive mixing using mechanical systems designed to disperse the inorganic material and additives in the polymer at a temperature above the melting point of the polymer. The proportion of inorganic material and additives in the mixture of polymer, inorganic material and additives is the same as that required in the final product. Suitable mixing equipment includes internal mixers of the Banbury type, twin or single screw extruders and continuous compounders. Once the inorganic material has been dispersed, the melted mixture must be converted into a particulate product form such as granules which will facilitate subsequent processing, e.g. injection molding or extrusion.

b) The polymer, inorganic material and other additives are mixed in a similar way to that described above, except that the inorganic material is first surface treated with a hydrophobic material to render it compatible with organic polymers. Examples of such hydrophobic materials include carboxylic acids of moderate to high molecular weight such as butyric, lauric, oleic and stearic acid, organosilane coupling agents, organotitanates and zircoaluminates. The proportion of inorganic material and other additives in the mixture of polymer, inorganic material and additives is much higher than is required in the final product. Inorganic material concentrations in the order of 75 to 80 weight percent may be produced using this technique. Mixtures with inorganic material contents above this level become both difficult to produce and difficult to redisperse in subsequent processing steps. The final particulate product (e.g. granules) is blended with unfilled thermoplastic polymer immediately prior to entering the final processing operation in such a ratio as to produce a mixture with a lower inorganic material content which is uniformly distributed and dispersed throughout the system.

c) Highly concentrated, redispersible inorganic material compositions are described in U.S. Pat. No. 4,803,231 which have inorganic material contents in excess of the 75 to 80% by weight achievable using conventional methods. This patent describes a composition which contains three components: (1) a polyolefin polymer or blend of polymers between 19.99 and 4.05 percent of the composition; (2) 80 to 95 percent inorganic material; and (3) an agent which renders the mixture fluid (a fluidifacient) included at 0.01 to 0.95 percent. This fluidifacient is describe as an orthophosphoric acid ester with the general formula:

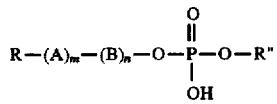

Where A represents ethylene oxide, B represents propylene oxide, 0<(m+n)<24, R represents an alkyl group (which may be linear or nonlinear, and may be saturated or unsaturated), an aryl group, or a heterocycle (which may be saturated or unsaturated), wherewith said alkyl, aryl or heterocycle group has 5–28 C atoms, preferably 8–24 C atoms, or R is a steroid group; wherewith further the group R may be branched or unbranched and/or may have one or more functional groups, for example, Halogen, —OH, —COOH, —COOR, —NO$_2$, —NH$_2$, —CONH$_2$, —CN OR OPO$_3$H$_2$; AND R' may be hydrogen, a carbon chain having 1–4 C atoms, or a group R as defined supra. Thus it is possible that the group R' is identical to the group R.

This composition may be blended with unfilled polymer prior to entering the final processing operation in such a ratio as to produce a mixture with a lower inorganic material content which is uniformly distributed and dispersed throughout the system. The resultant mixture contains a reduced level of the polyolefin polymer used for preparation of the concentrate as a result of the increased concentration of inorganic material. In discussing this invention in the common assignee's Canadian Patent Application No. 2016447 (the discussion is of equivalent patent EP 0 203 017) it is observed that although a theoretical level of filler of up to 95 percent is disclosed, a practical limit is only 88% by weight of calcium carbonate. In addition, the use of relatively toxic phosphate esters limits the applicability of this system to non-food contact systems.

d) European Patent Application No. 0355808 describes the use of a mixture of a fatty acid salt in combination with a fatty acid amide in the ratios between 10:90 and 90:10 as a coating for calcium carbonate to reduce the surface tension of the inorganic material surface. This coating was also evaluated as a replacement for the orthophosphate ester described in U.S. Pat. No. 4,803,231 (described above) with a view to producing a redispersible composite.

e) The aforementioned Canadian Patent Application No. 2016447 describes a process used to produce a redispersible composite which uses a volatile solvent to prepare the product. This solvent and moisture are eliminated, leaving a inorganic material containing a hydrophobic coating in a hydrophobic binding agent. The composition of this product after elimination of solvent and dispersing agent is claimed to be 92.1–96.1% inorganic material, 0.1–3.0% of a hydrophobic surface coating agent and 3.8–4.9% of a hydrophobic binder system. This product may be added directly to thermoplastic systems in such proportion as is required by the final formulation. The reduced binder content allows addition to flame retardant polymer systems without adversely influencing flame retardancy. The volatilization step used in this process tends to introduce undesirable complexity and costs.

In general, it will therefore be evident from the foregoing that the methods available to date are based either on use of high binder contents and hence introduce a high binder content into the final polymer composition; or rely on the use of dispersion or fluidifacient additives or agents to allow a highly concentrated inorganic material composite to be produced which will redisperse with ease in thermoplastic polymers.

SUMMARY OF INVENTION

Now in accordance with the present invention, a thermoplastic granule is provided containing a high proportion of a particulate carbonate filler in a thermoplastic binder, for blending with an end product thermoplastic in which the carbonate filler is to be dispersed. The granule comprises at least 85% by weight (and preferably 85 to 92% by weight) of a particulate carbonate which is coated with a fatty acid or blend of fatty acids having a carbon chain length of from 12 to 20 carbon atoms. The balance of the granule by weight is a thermoplastic polymeric binder which is solid at ambient temperature and is compatible with the end product thermoplastic in which the carbonate filler is to be dispersed. The polymeric binder is selected from one or more members of the group consisting of amorphous polyolefins and highly branched polyethylene waxes.

The term "granule" as used herein is intended to refer to the individual discrete components which in total comprise a particulate which as such is in use blended with the aforementioned end product thermoplastic. These discrete components can have irregular surface characteristics as commonly results from granulation, or can have smooth continuous surfaces as a result of pelletization. Both of these discrete types of assemblages are intended to be encompassed herein by the term "granule".

In order to maximize the particle packing characteristics, the particle size distribution of the carbonate incorporated into the granule is in accordance with the equation (1) Cumulative Percent finer than $$D = \frac{(D^n - D_s^n)}{D_L^n - D_s^n} \times 100\%$$

where
D=Particle size
$D_s$=Smallest particle size—selected
$D_L$=Largest particle size—selected
n=Distribution modulus;

$D_L$ should be in the range of 100 to 1.0 μm; $D_s$ in the range of 10 to 0.01 μm; and n is accorded a value appropriate for particles assumed to be approximately spherical. Preferably $D_L$ is in the range of 44 to 2 μm, $D_s$ is in the range of 0.5 to 0.1 μm, and n is about 0.37. The carbonate used in the pellet may be an alkaline earth metal carbonate, such as a calcium carbonate, dolomite, magnesite or strontium carbonate, and is preferably a ground or chemically precipitated calcium carbonate or a mixture of ground and precipitated calcium carbonates. In many applications a ground marble is found to be particularly advantageous.

The method of producing desired particle sizes may be by comminution of naturally occurring carbonate minerals by a dry or a wet process, or by precipitation from an aqueous medium. They may be produced by blending of components having different PSD's or from a production process which generates them naturally.

The thermoplastic granules of the invention are typically in the size range of from 5 to 10 mesh, and the end product thermoplastic with which the granules are to be blended may comprise granules in the same 5 to 10 mesh range.

The invention does not require the use of additional chemical materials for the purpose of preparation of the particulate product (the granules) or of re-dispersion of the particulate product in a thermoplastic composition, and thus the granules of the invention are preferably substantially free of a dispersing or fluidifacient additive. The granules may, however, include any additional functional additives which may be desired in the final thermoplastic formulation.

The hydrophobic material should be selected to render the surface of the inorganic material surface hydrophobic and compatible with organic polymers. Examples of such hydrophobic materials include carboxylic acids, or their salts, having from 3 to 20 carbon atoms in their hydrocarbon chain such as butyric, lauric, oleic and stearic acid, organosilane coupling agents, organotitanates and zircoaluminates. Other hydrophobic coating agents may be utilized.

Binders for use in the invention, preferably comprise an amorphous polyolefin or a highly branched polyethylene wax. Typical such binders are polypropylene homopolymers and amorphous copolymers of propylene and ethylene or butylene. It should be appreciated that the binders of the invention differ markedly from conventional prior art binders used in pellets of the present type. These conventional binders are typically polyolefins and polyolefin waxes, which are thereby highly compatible with polyolefin polymers.

DESCRIPTION OF PREFERRED EMBODIMENTS

The invention will now be illustrated by a series of Examples, which should be considered as illustrative only and not delimitive of the invention otherwise set forth.

Figure 1:
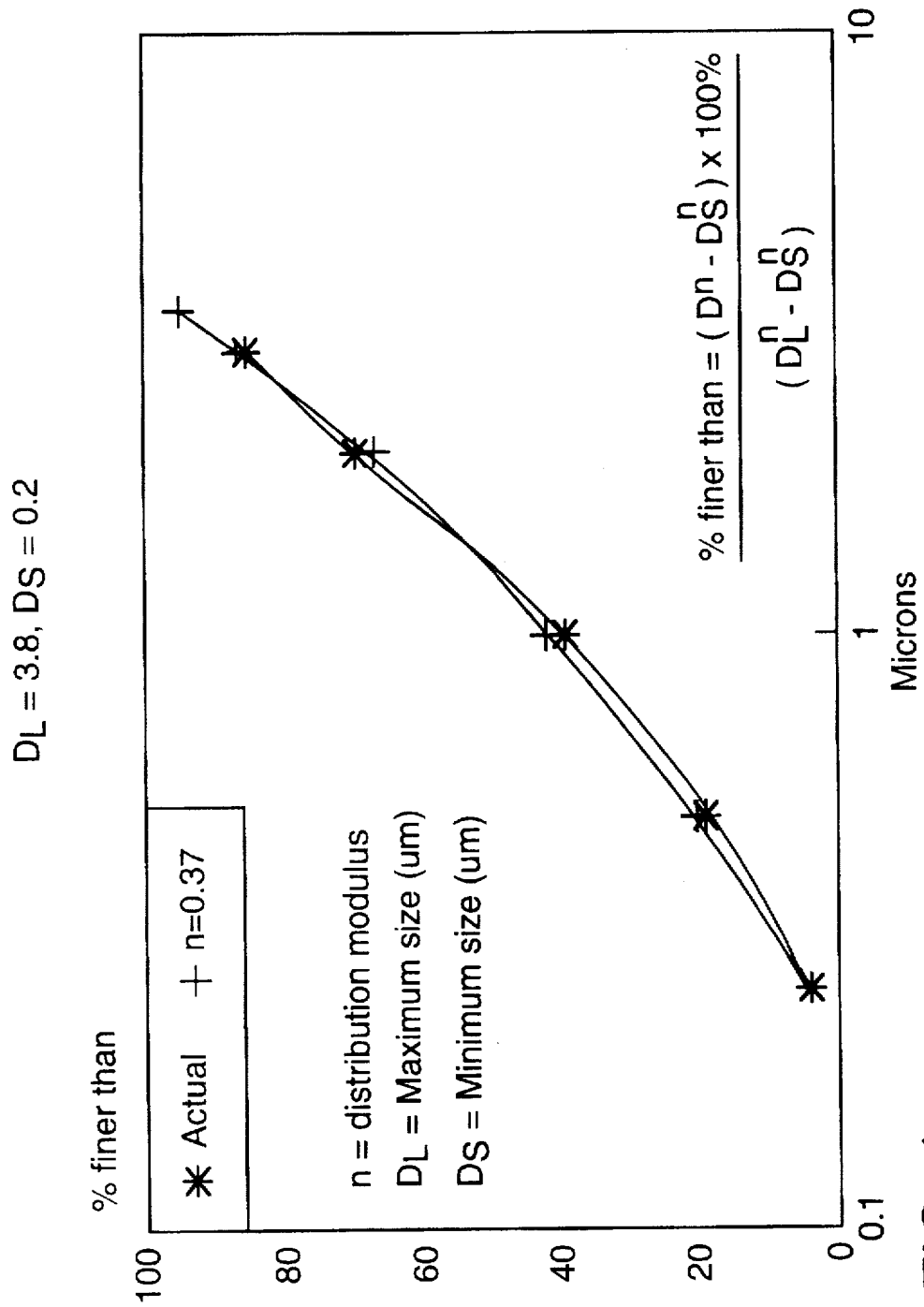
FIGS. 1 through 3 are graphs depicting particle size distributions for different ground calcium carbonate materials suitable for use in the invention, compared to values calculated by use of equation (1)
Figure 2:
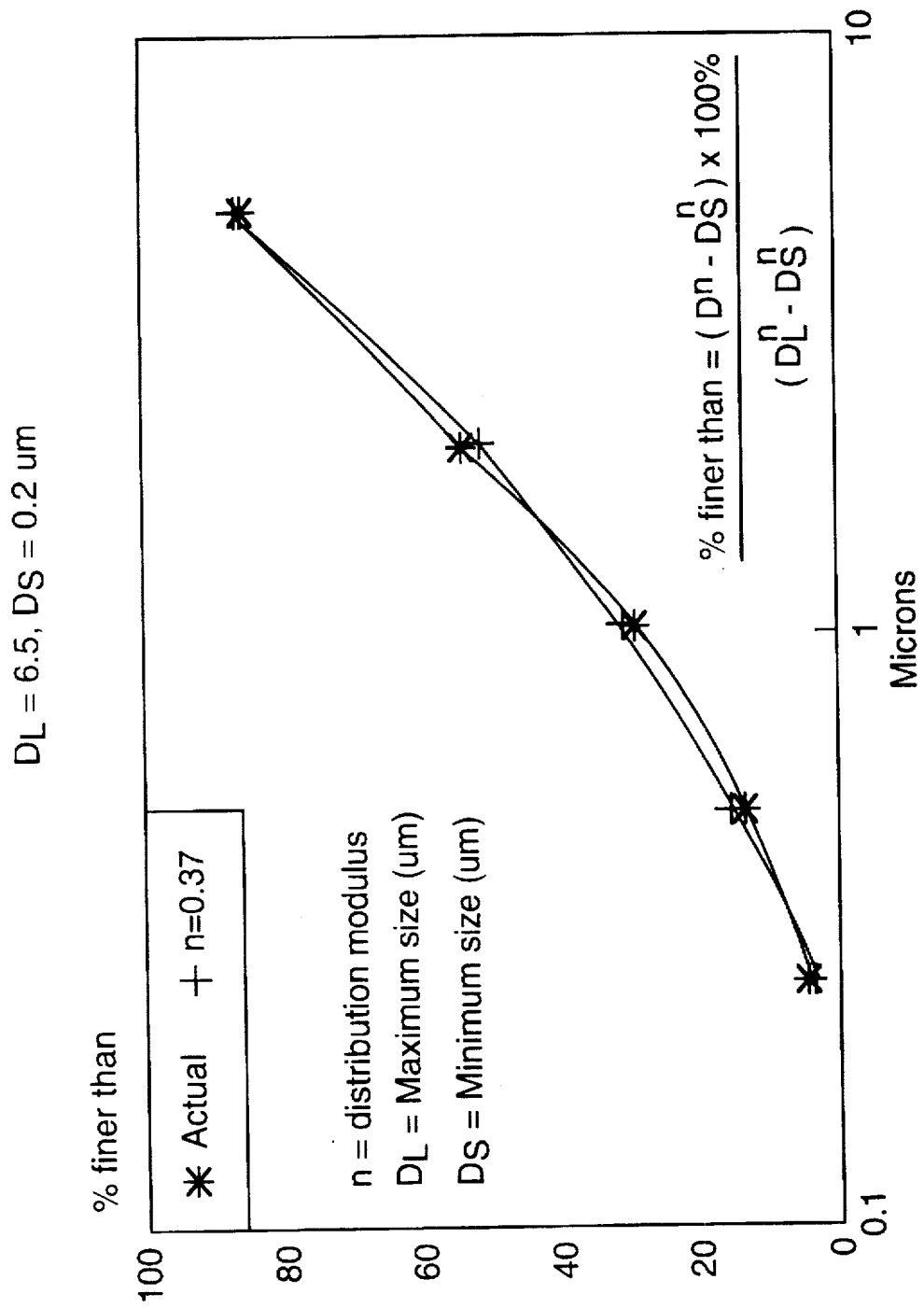
Figure 3:
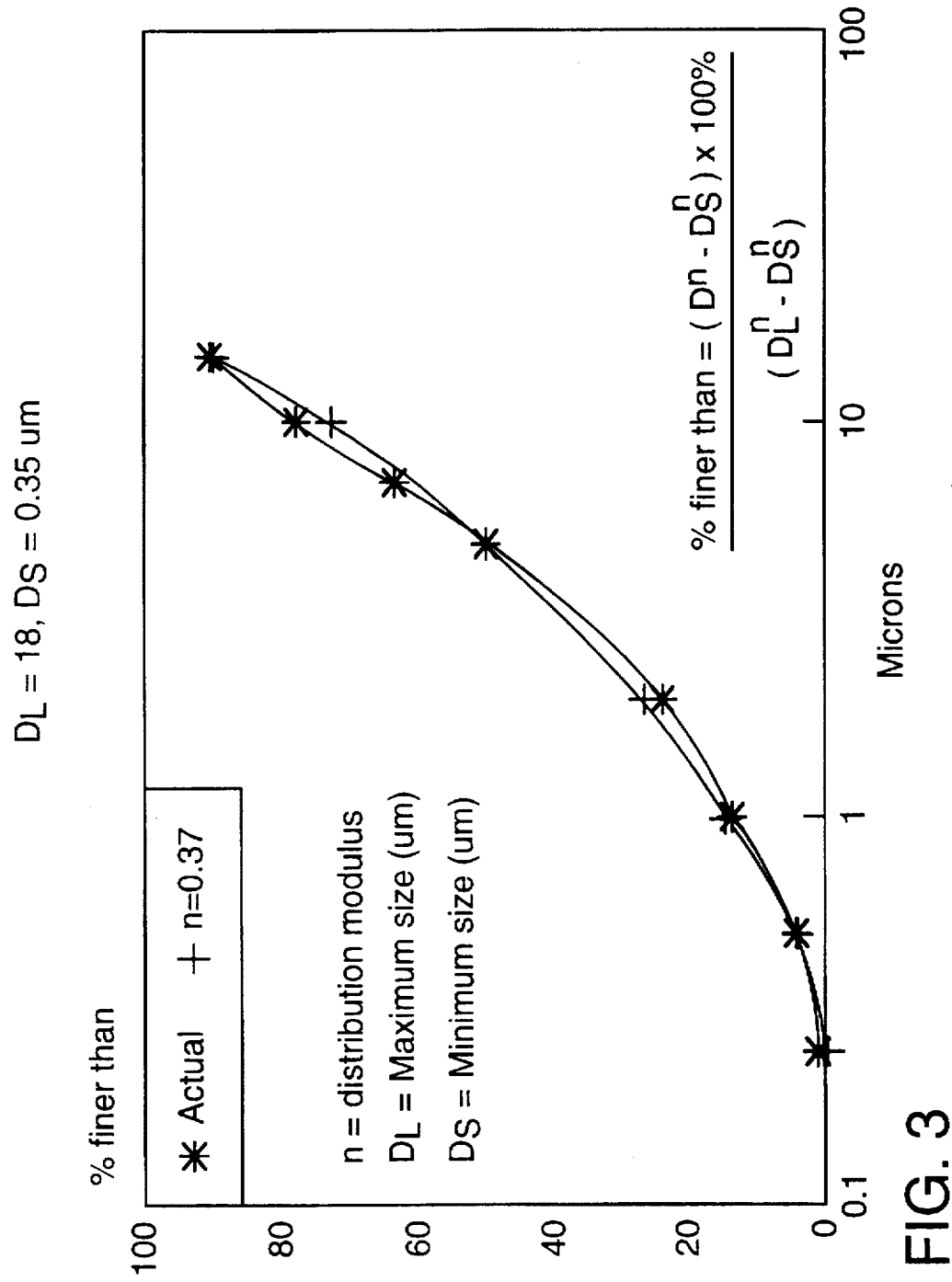

In the graphs of FIGS. 1 through 3, particle size distributions ("PSD's") for three different ground calcium carbonate products are shown, in comparison to the PSD calculated by use of equation (1). The ground calcium carbonate in each instance has a value of $D_S$ and $D_L$ as indicated in the Figure, and it will be evident that the said ground products very closely accord with the calculated curves. These ground products are appropriate for use with the present invention, and are used in the ensuing Examples.

The binders for the granules should be chemically and physically compatible with the host or matrix thermoplastic so that the resulting end product is not significantly weakened or discolored by the presence of the binder, and does not exhibit surface bloom from migration of the granule binder to the product surface.

Among the amorphous polyolefins utilizable as binders in the granules of the invention are amorphous polypropylene homopolymers. These differ from conventional polypropylenes which are highly crystalline.

The viscosities of useful such amorphous homopolymers (ASTM D3236) are in the range of 1000–2300 cps at 190° C. This translates to a theoretical Melt Flow Index of ca 90.000–40.000 g/10 minutes. Conventional polypropylene and polyethylene polymers have Melt Flow Indices in the range 200 down to 0.1.

Other less preferred grades of such homopolymers for use in the invention have a viscosity of 200 cps at 190° C. (equivalent to 500.000 g/10 minutes MFI). A viscosity of 200 to 20.000 cps is preferred (equivalent to 500,000–5,000 g/10 minutes MFI); a viscosity of 500 to 5,000 cps is more preferred (equivalent to 200,000–15,000 g/10 minutes MFI); and a viscosity of 1,000 to 2,500 cps is most preferred (equivalent to 90,000–35,000 g/10 minutes MFI).

Amorphous copolymers of propylene and ethylene, and mixtures of copolymer with homopolymer are also effective for use in the invention.

The highly branched polyethylene waxes for use in the invention are preferably saturated, non-polar, synthetic hydrocarbon waxes which have been chemically neutralized. The special HULS/VEBA modification of the Ziegler low pressure polymerization of ethylene is typically used to produce the unique characteristics of this group of materials. The process confers branched-chain iso-paraffinic configurations.

The grade particularly preferred for use in the invention has a very high iso-paraffin (branched) configuration and is predominantly branched chain. A typical such product has 70% branching, a molecular weight of 3,500 (by osmometry), an ASTM D-566 drop point at 102°–110° C., density is 0.92, and a viscosity at 150° C. of 300–380 cps.

EXAMPLE 1

Calcium carbonate with a $D_L$ of 18 micrometers and a $D_S$ of 0.35 micrometers (FIG. 3) was treated with 1.0 percent of stearic acid in a high speed mixer running at 4000 rpm for 5 minutes at a temperature of 120 degrees celsius. This product was then placed in an internal mixer at a temperature of 160° C. with an amorphous polypropylene homopolymer with a melting point of 152° C. in the ratio of 92:8 of treated calcium carbonate:polypropylene and was kneaded to form a homogeneous mixture. The resultant mixture was formed into granules by passing through a granulator and screening the resultant granules between 5 mesh and 10 mesh screens. The granulated product thus produced was blended with conventional polypropylene homopolymer with a melt flow index of 4.0 in the ratio of 88.9:11.1 polypropylene:granules. The blend was metered into a Kawaguchi reciprocating screw injection molding machine containing a screw with no mixing elements. The very high calcium carbonate-containing granules (92% $CaCO_3$) dispersed readily into the blend and produced visually homogeneous molded parts.

EXAMPLE 2

Calcium carbonate with a $D_L$ of 18 micrometers and a $D_S$ of 0.35 micrometers (FIG. 3) was treated with 1.0 percent of stearic acid in a high speed mixer running at 4000 rpm for 5 minutes at a temperature of 120° C. This product was then placed in an internal mixer at a temperature of 131° C. with a highly branched polyethylene wax with a melting point of 121° C. in the ratio of 92:8 of treated calcium carbonate:polyethylene wax and was kneaded to form a homogeneous mixture. The resultant mixture was formed into granules by passing through a granulator and screening the resultant granules between 5 mesh and 10 mesh screens. The granulated product thus produced was blended with conventional polypropylene homopolymer with a melt flow index of 4.0 in the ratio of 88.9:11.1 polypropylene:granules. The blend was metered into a Kawaguchi reciprocating screw injection molding machine containing a screw with no mixing elements. The granules dispersed readily into the blend, and visually homogeneous calcium carbonate filled parts were molded.

EXAMPLE 3

Calcium carbonate with a $D_L$ Of 18 micrometers and a $D_S$ of 0.35 micrometers (FIG. 3) was treated with 1.0 percent of stearic acid in a high speed mixer running at 4000 rpm for 5 minutes at a temperature of 150° C. This product was then placed in an internal mixer at a temperature of 160° C. with polypropylene homopolymer in the ratio of 90:10 of treated calcium carbonate:polypropylene and was kneaded to form a homogeneous mixture. The resultant mixture was formed into granules by passing through a granulator and screening the resultant granules between 5 mesh and 10 mesh screens. The granulated product thus produced was blended with linear low density polyethylene with a melt flow index of 50 in the ratio of 88.9:11.1 polyethylene:granules. The blend was metered into an Arburg All-rounder 35 ton reciprocating screw injection molding machine containing a screw with no mixing elements. Homogeneous calcium carbonate filled parts were molded with the following properties (Table 1). It will be evident that the strength properties of the filled parts have not been substantially reduced. Optical properties are seen to be altered as a result of the addition of the calcium carbonate. The significance of this depends on the contemplated end use.

TABLE 1

|  | Unfilled | Filled |
|---|---|---|
| Tensile strength (psi) | 2045 | 1987 |
| Elongation at break (%) | 350 | 340 |
| Flexural strength (psi) | 1441 | 1470 |
| Flexural modulus (psi × 100,000) | 0.29 | 0.30 |
| Izod impact strength (ft. lb/in) |  |  |
| Notched | no break | 2.3 |
| Unnotched | no break | no break |
| Gardner impact strength (ft. lb) | 119 | 100 |
| GE Brightness | 32.8 | 52.5 |
| Hunter L | 53.8 | 73.2 |
| Hunter a | −0.71 | −1.13 |
| Hunter b | −5.20 | 1.18 |

EXAMPLE 4

Calcium carbonate with a $D_L$ of 18 micrometers and a $D_S$ of 0.35 micrometers (FIG. 3) was treated with 1.0 percent of stearic acid in a high speed mixer running at 4000 rpm for 5 minutes at a temperature of 150° C. This product was then mixed using a two roll mill at a temperature of 160° C. with a highly branched polyethylene wax in the ratio of 90:10 of treated calcium carbonate:wax to form a homogeneous mixture. The resultant mixture was formed into granules by passing through a granulator and screening the resultant granulate between 5 mesh and 10 mesh screens. The granulated product thus produced was blended with high density polyethylene with a melt flow index of 30 in the ratio of 88.9:11.1 polyethylene:granules. The blend was metered into an Arburg All-rounder 35 ton reciprocating screw injection molding machine containing a screw with no mixing elements. Homogeneous calcium carbonate filled parts were molded with the following properties (Table 2)

TABLE 2

|  | Unfilled | Filled |
|---|---|---|
| Tensile strength (psi) | 4136 | 3457 |
| Elongation at break (%) | 74 | 47 |
| Flexural strength (psi) | 5575 | 5174 |
| Flexural modulus (psi × 100,000) | 2.01 | 1.96 |
| Izod impact strength (ft. lb/in) | | |
| Notched | 1.5 | 1.0 |
| Unnotched | no break | 17.9 |
| Gardner impact strength (ft. lb) | 264 | 120 |
| GE Brightness | 47.0 | 58.6 |
| Hunter L | 67.1 | 77.2 |
| Hunter a | −1.81 | −1.71 |
| Hunter b | −1.78 | 1.18 |

EXAMPLE 5

A ground calcium carbonate with a $D_L$ of 3.8 micrometers and a $D_S$ of 0.2 micrometers (FIG. 1) was treated with 1.2 percent of stearic acid in a high speed mixer running at 4000 rpm for 5 minutes at a temperature of 150° C. This product was then mixed using a two roll mill at a temperature of 162° C. with an amorphous polypropylene wax with a melting point of 152° C. in the ratio of 85:15 of treated calcium carbonate:amorphous polypropylene to form a homogeneous mixture. The resultant mixture was formed into granules by passing through a granulator and screening the resultant granulate between 5 mesh and 10 mesh screens. The granulated product thus produced was blended with a conventional polypropylene homopolymer with a melt flow index of 4 in the ratios of 88.2:11.8, 76.5:23.5 and 64.7:35.3 of polypropylene:granules to give calcium carbonate loadings of 10, 20 and 30 weight percents respectively. The blends were metered into an Arburg All-rounder 35 ton reciprocating screw injection molding machine containing a screw with no mixing elements. Homogeneous calcium carbonate filled parts were molded with the following properties (Table 3)

TABLE 3

|  | Unfilled | 10% | 20% | 30% |
|---|---|---|---|---|
| Tensile strength (psi) | 5077 | 4482 | 4154 | 3854 |
| Elongation at break (%) | 33 | 57 | 51 | 58 |
| Flexural strength (psi) | 6248 | 6245 | 6323 | 5949 |
| Flexural modulus (psi × 100,000) | 2.17 | 2.57 | 2.75 | 2.98 |

TABLE 3-continued

|  | Unfilled | 10% | 20% | 30% |
|---|---|---|---|---|
| Izod impact strength (ft. lb/in) | | | | |
| Notched | 0.55 | 0.82 | 0.77 | 0.89 |
| Unnotched | 26.6 | 25.3 | 26.2 | 24.9 |
| Gardner impact strength (ft. lb) | 46 | 34 | 40 | 42 |
| GE Brightness | 15.7 | 61.1 | 63.4 | 63.4 |
| Hunter L | 35.0 | 79.0 | 81.8 | 82.1 |
| Hunter a | −0.46 | −1.00 | −0.71 | −0.58 |
| Hunter b | −7.13 | 1.22 | 3.19 | 3.58 |

EXAMPLE 6

Calcium carbonate with a $D_L$ of 6.5 micrometers and a $D_S$ of 0.2 micrometers (FIG. 2) was treated with 1.2 percent of stearic acid in a high speed mixer running at 4000 rpm for 5 minutes at a temperature of 150° C. This product was then mixed using a two roll mill at a temperature of 130° C. with polyethylene wax with a melting point of 120° C. in the ratio of 85:15 of treated calcium carbonate:polyethylene to form a homogeneous mixture. The resultant mixture was formed into granules by passing through a granulator and screening the resultant granulate between 5 mesh and 10 mesh screens. The granulated product thus produced was blended with polypropylene homopolymer with a melt flow index of 4 in the ratios of 88.2:11.8, 76.5:23.5 and 64.7:35.3 of polypropylene:granules to give calcium carbonate loadings of 10, 20 and 30 weight percents respectively. The blends were metered into an Arburg All-rounder 35 ton reciprocating screw injection molding machine containing a screw with no mixing elements. Homogeneous calcium carbonate filled parts were molded with the following properties (Table 4)

TABLE 4

|  | Unfilled | 10% | 20% | 30% |
|---|---|---|---|---|
| Tensile strength (psi) | 5040 | 4594 | 4188 | 3882 |
| Elongation at break (%) | 32 | 46 | 47 | 55 |
| Flexural strength (psi) | 6389 | 6375 | 6438 | 6381 |
| Flexural modulus (psi × 100,000) | 2.15 | 2.59 | 2.93 | 3.17 |
| Izod impact strength (ft. lb/in) | | | | |
| Notched | 0.74 | 0.77 | 0.89 | 0.79 |
| Unnotched | 27.4 | 24.2 | 24.3 | 24.1 |
| Gardner impact strength (ft. lb) | 24 | 16 | 32 | 54 |
| GE Brightness | 18.8 | 60.5 | 63.6 | 64.0 |
| Hunter L | 38.9 | 78.4 | 81.7 | 82.5 |
| Hunter a | −0.50 | −0.89 | −0.64 | −0.41 |
| Hunter b | −6.90 | 0.93 | 2.88 | 3.58 |

In the above Examples, tensile strength and elongation at break were measured by the procedure laid down in ASTM Standard No. D638, flexural strength and flexural modulus by the procedure laid down in ASTM Standard No. D790, Izod impact strength by the procedure laid down in ASTM Standard No. D256, and Gardner impact strength by the procedure laid down in ASTM Standard No. D:3029 method G, and GE brightness by the procedure laid down in TAPPI Standard No. T646om86.

The color of the thermoplastic compositions was measured, using a disc as a test piece, by a system which is based on the formula known as the Hunter L a b formula using an illuminant C light source. Five measurements of the light were made using a Technidyne spectrophotometer to determine the tristimulus values X, Y and Z. L, a and b values were calculated according to the formulae:

$$L=100(Y/Y_o)^{1/2}$$

$$a=Ka(X/X_o-Y/Y_o)/(Y/Y_o)^{1/2}$$

$$b=Kb(Y/Y_o-Z/Z_o)/(Y/Y_o)^{1/2}$$

where Ka and Kb are the chromaticity coefficients.

and $X_o$, $Y_o$, $Z_o$ are tristimulus values for a perfect diffuser. For illuminant C Ka=175, Kb=70, $X_o$=98.041, $Y_o$=100.000, $Z_o$=118.103

The L value can be said to represent the lightness or darkness of shade, while the a and b values can be said to be coordinates representing chromaticity (-a=green, +a=red, -b=blue and +b=yellow).

EXAMPLE 7

Figure 4:
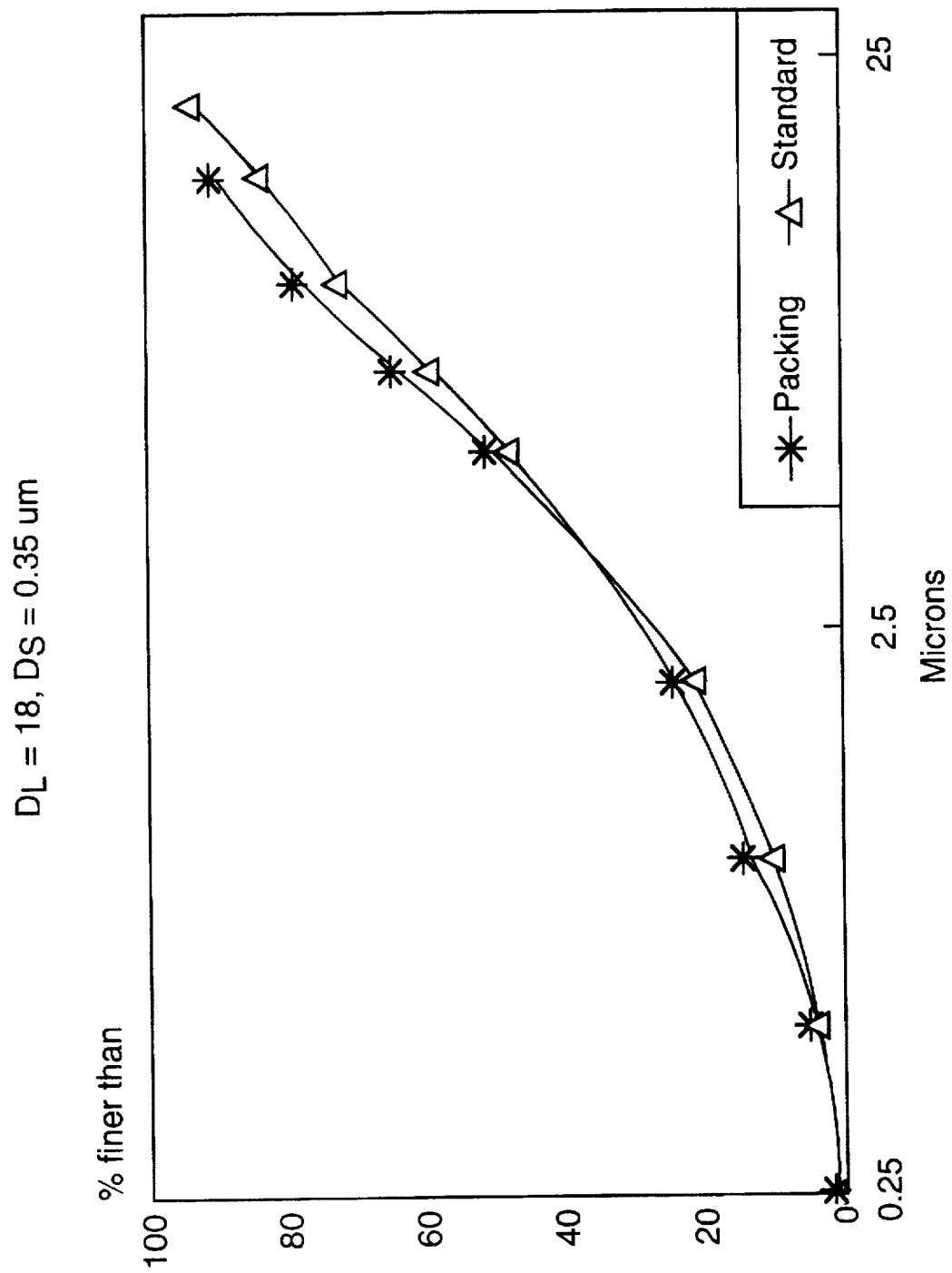
FIG. 4 is a graph comparing the PSD for a ground calcium carbonate not in accord with the invention, with the PSD for the ground product in FIG. 3.

A series of samples of granules were prepared by the method of Example 1, using different loading levels of calcium carbonate. The carbonate was of two types—(1) the carbonate of Example 1; and (2) control ground marble having a PSD not conforming to Equation (1), but having a median particle size the same as the carbonate used in Example 1. FIG. 4 depicts the PSD for the ground carbonate (2) which is not in accord for use in the invention, and compares this with the PSD for the ground product (1) of Example 1. The scale used in FIG. 4 is linear (FIGS. 1 to 3 employ a logarithmic scale for the abscissa) in order to clearly show the differences in the respective PSD's. Two different binders were used, viz. a conventional binder, i.e. a conventional paraffin wax, and an amorphous polypropylene of the type used in Example 1. The % solids content of the granule above which dispersion does not occur in polypropylene was determined by visually examining the resultant specimens for undispersed agglomerates. The results were as follows:

TABLE 5

% SOLIDS CONTENT OF THE GRANULE, ABOVE WHICH DISPERSION IN POLYPROPYLENE DOES NOT OCCUR

|  | Conventional Binder | Binder of Invention |
|---|---|---|
| Control Carbonate | below 80% | 87% |
| Carbonate of Example 1 | below 80% | 90–92% |

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A thermoplastic granule containing a high proportion of a particulate carbonate filler in a thermoplastic binder, for blending with an end product thermoplastic in which the carbonate filler is to be dispersed; comprising:

85% to 92% by weight of a particulate carbonate having a particle size distribution in accordance with the equation $$\text{Cumulative Percent finer than } D = \frac{(D^n - D_s^n)}{D_L^n - D_s^n} \times 100\%$$

where

D=Particle size $D_s$=Smallest particle size and is in the range of 10 to 0.1 μm;

$D_L$=Largest particle size and is in the range of 100 to 1.0 μm;

n=Distribution modulus and has a value appropriate for carbonate particles assumed to be approximately spherical;

which carbonate is coated with one or more fatty acids having a carbon chain length of from 12 to 20 carbon atoms; the balance of said granule by weight being a thermoplastic polymeric binder which is solid at ambient temperature and is compatible with said end product thermoplastic in which said carbonate filler is to be dispersed, said polymeric binder being selected from one or more members of the group consisting of amorphous polyolefins and highly branched polyethylene waxes.

2. A thermoplastic granule in accordance with claim 1, in which $D_L$ is in the range of 44 to 2 μm, $D_s$ is in the range of 0.5 to 0.1 μm, and n is about 0.37.

3. A thermoplastic granule in accordance with claim 1, wherein said carbonate is an alkaline earth metal carbonate.

4. A thermoplastic granule in accordance with claim 3, wherein said carbonate is a ground carbonate.

5. A thermoplastic granule in accordance with claim 4, wherein said carbonate is a ground marble.

6. A thermoplastic granule in accordance with claim 3, wherein said carbonate comprises a chemically precipitated calcium carbonate.

7. A thermoplastic granule in accordance with claim 3, wherein said carbonate is a mixture of ground and precipitated calcium carbonates.

8. A thermoplastic granule in accordance with claim 3, in which said granule is the size range of from 5 to 10 mesh, and wherein said end product thermoplastic with which said granule is to be blended comprises granules in said 5 to 10 mesh range.

9. A thermoplastic granule in accordance with claim 1, in which said binder comprises an amorphous polypropylene homopolymer.

10. A thermoplastic granule in accordance with claim 1, in which said binder comprises an amorphous copolymer of propylene and ethylene.

11. A thermoplastic granule in accordance with claim 1, in which said binder comprises an amorphous copolymer of propylene and butylene.

12. A thermoplastic granule in accordance with claim 1, in which said binder comprises a saturated, non-polar, synthetic hydrocarbon wax which has been chemically neutralized and is predominantly branched chain.

13. A method for preparing a thermoplastic end product in which a carbonate filler is dispersed; comprising:

preparing thermoplastic granules containing a high proportion of a particulate carbonate filler in a thermoplastic binder, for bleeding with the end product thermoplastic in which the carbonate filler is to be dispersed; said granules comprising 85% to 92% by weight of a particulate carbonate having a particle size distribution in accordance with the equation $$\text{Cumulative Percent finer than } D = \frac{(D^n - D_s^n)}{D_L^n - D_s^n} \times 100\%$$

where

D = Particle size $D_s$ = Smallest particle size and is in the range of 10 to 0.1 µm;

$D_L$ = Largest particle size and is in the range of 100 to 1.0 µm;

n = Distribution modulus and has a value appropriate for carbonate particles assumed to be approximately spherical;

which carbonate is coated with one or more fatty acids having a carbon chain length of from 12 to 20 carbon atoms; the balance of said granule by weight being a thermoplastic polymeric binder which is solid at ambient temperature and is compatible with said end product thermoplastic in which said carbonate filler is to be dispersed, said polymeric binder being selected from one or more members of the group consisting of amorphous polyolefins and highly branched polyethylene waxes blending said granules with said end product thermoplastic to achieve the desired loading with said filler; and forming the resulting blend into the shape of said end product.

14. The method of claim 13, in which $D_L$ is in the range of 44 to 2 µm, $D_s$ is in the range of 0.5 to 0.1 µm, and n is about 0.37.

15. The method of claim 13, in which the binder of said thermoplastic granules comprises an amorphous polypropylene homopolymer.

16. The method of claim 13, in which said binder for said granules comprises a saturated, non-polar, synthetic hydrocarbon wax which has been chemically neutralized and is predominantly branched chain.

17. A thermoplastic end product prepared in accordance with the method of claim 13.

18. A method for preparing a carbonate filled molded thermoplastic end product, comprising:

blending the thermoplastic material which is to be filled with said carbonate with thermoplastic granules containing a high proportion of a particulate carbonate filler in a thermoplastic binder to disperse said carbonate in the thermoplastic material to be filled at a desired loading; said granules comprising 85% to 92% by weight of a particulate carbonate having a particle size distribution in accordance with the equation $$\text{Cumulative Percent finer than } D = \frac{(D^n - D_s^n)}{D_L^n - D_s^n} \times 100\%$$

where

D = Particle size $D_s$ = Smallest particle size and is in the range of 10 to 0.1 µm;

$D_L$ = Largest particle size and is in the range of 100 to 1.0 µm;

n = Distribution modulus and has a value appropriate for carbonate particles assumed to be approximately spherical;

which carbonate is coated with one or more fatty acids having a carbon chain length of from 12 to 20 carbon atoms; the balance of said granules by weight being a thermoplastic polymeric binder which is solid at ambient temperature and is compatible with said end product thermoplastic in which said carbonate filler is to be dispersed, said polymeric binder being selected from one or more members of the group consisting of amorphous polyolefins and highly branched polyethylene waxes; and molding the resultant blend into the shape of said end product.

19. A carbonate filled molded thermoplastic end product prepared in accordance with the method of claim 18.

20. A thermoplastic granule containing a high proportion of a particulate carbonate filler in a thermoplastic binder, comprising 85% to 92% by weight of a particulate carbonate having a particle size distribution in accordance with the equation $$\text{Cumulative Percent finer than } D = \frac{(D^n - D_s^n)}{D_L^n - D_s^n} \times 100\%$$

where

D = Particle size $D_s$ = Smallest particle size and is in the range of 10 to 0.1 µm;

$D_L$ = Largest particle size and is in the range of 100 to 1.0 µm;

n = Distribution modulus and has a value appropriate for carbonate particles assumed to be approximately spherical;

which carbonate is coated with one or more fatty acids having a carbon chain length of from 12 to 20 carbon atoms;

the balance of said granule by weight being a thermoplastic polymeric binder which is solid at ambient temperature, said polymeric binder being selected from one or more members of the group consisting of amorphous polyolefins and highly branched polyethylene waxes.

21. Thermoplastic granules containing a high proportion of a particulate carbonate filler in a thermoplastic binder prepared by a process of blending 85% to 92% by weight of a particulate carbonate having a particle size distribution in accordance with the equation $$\text{Cumulative Percent finer than } D = \frac{(D^n - D_s^n)}{D_L^n - D_s^n} \times 100\%$$

where

D = Particle size $D_s$ = Smallest particle size and is in the range of 10 to 0.1 µm;

$D_L$ = Largest particle size and is in the range of 100 to 1.0 µm;

n = Distribution modulus and has a value appropriate for carbonate particles assumed to be approximately spherical;

which carbonate is coated with one or more fatty acids having a carbon chain length of from 12 to 20 carbon atoms, with a thermoplastic polymeric binder making up the balance of said granules by weight which is solid at ambient temperature and is selected from one or more members of the group consisting of amorphous polyolefins and highly branched polyethylene waxes.

\* \* \* \* \*